Patented Jan. 3, 1950

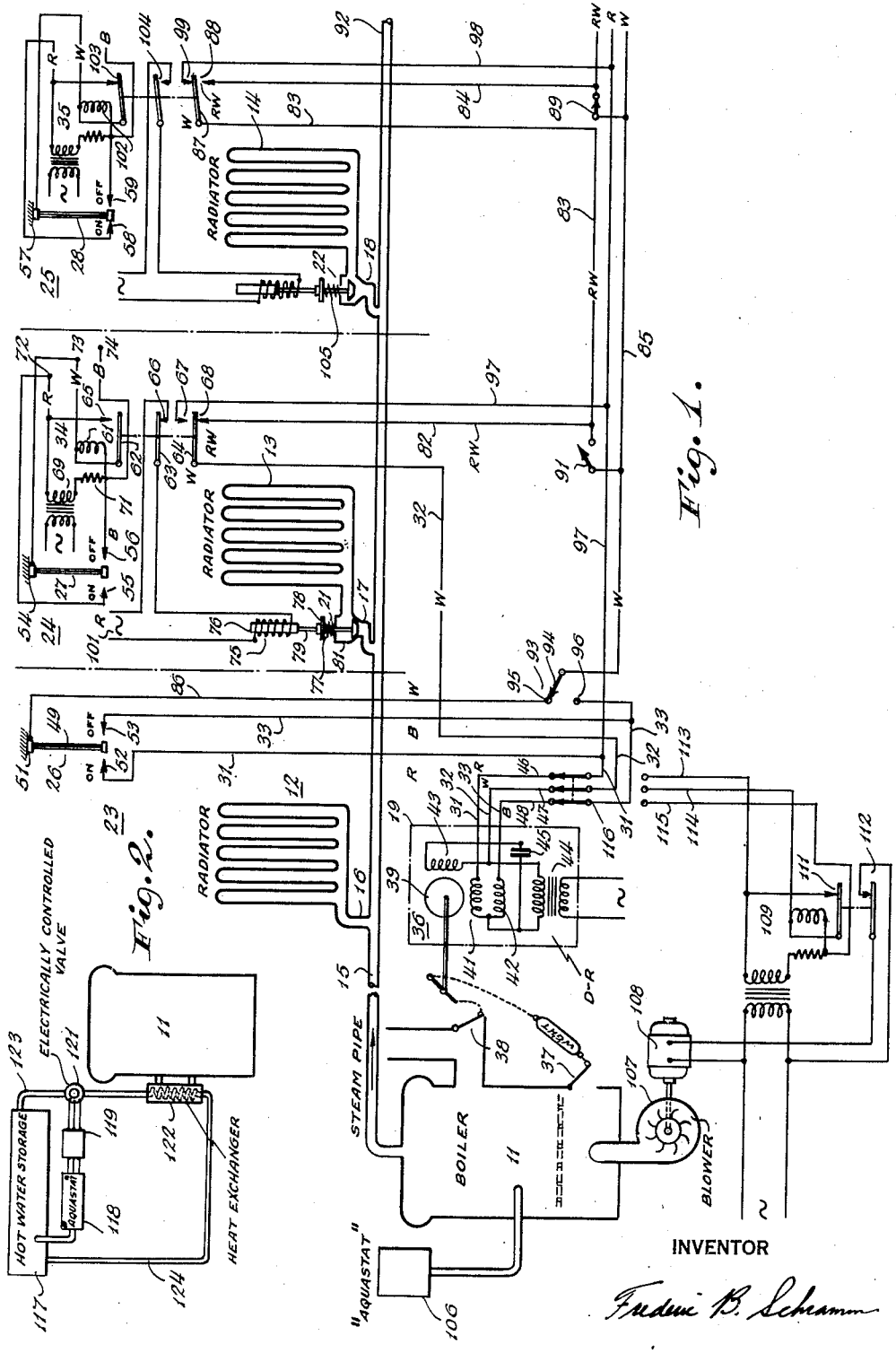

2,493,365

UNITED STATES PATENT OFFICE 2,493,365

CONTROL SYSTEM

Frederic B. Schramm, Garden City, N. Y.

Application May 13, 1943, Serial No. 486,813

9 Claims. (Cl. 237—9)

My invention relates to heating systems and concerns, particularly arrangements for controlling distribution of heat and other forms of energy.

An object of my invention is to provide an improved energy distribution system.

Another object is to provide improved methods and apparatus for maintenance of temperature in the system and for maintaining different temperatures in different areas.

A further object is to provide a system in which minimum disturbance to effective operation is produced in the event of power failure or failure of the control system.

Another object of the invention is to provide a distribution system having independent temperature or energy intensity control in each of several different areas although a common energy source is utilized.

Still another object of the invention is to provide a system in which double-throw thermostats may be employed.

Another object is to provide a system in which radiators or energy dissipators may be operated with normally opened valves to avoid interference with uncontrolled operation in the event of failure of power or of breakdowns in the control system.

Still another object of the invention is to provide a heating system in which a heat exchanger valve may be controlled independently of the remainder of the system.

Other and further objects and advantages of the system will become apparent as the description proceeds.

In accordance with my invention in its preferred form, I provide a suitable source of heat energy together with radiators or the like for dissipating energy in the desired areas. An electrically operated controller for the heat supply source is provided and thermostatically controlled valves are provided for independently controlling temperature or intensity of energy in various areas. A better understanding of the invention will be afforded by the following detailed description considered in connection with the accompanying drawing, and those features of the invention which are believed to be novel and patentable will be pointed out in the claims appended hereto.

In the drawing,

Fig. 1 is a schematic diagram including an electric circuit diagram of one embodiment of my invention, and Fig. 2 is a fragmentary schematic diagram of a modification in the arrangement of Fig. 1.

Like reference numerals are utilized throughout the drawing to designate like parts.

The system illustrated in Fig. 1 comprises a source of heat energy such as a steam heating furnace, 11 for example, with a plurality of energy dissipating elements such as radiators 12, 13 and 14, and supply lines connecting the heat source 11 to the radiators which may take the form in the specific system illustrated of a steam pipe 15 with branch pipes or connections 16, 17 and 18.

For controlling the heat source 11, a suitable device such as a damper regulator 19 may be provided and for controlling the heat supplied to the radiators 13 and 14, valves 21 and 22 may be interposed in the branch lines or radiator connections 17 and 18 respectively. For reasons which will be explained hereinafter, automatically controlled valves are not necessarily required for all the radiators and the radiator 12 is shown without any automatic valve.

The radiators 12, 13 and 14 are assumed to be located in different rooms, spaces or areas 23, 24 and 25 in which it may be desired to maintain the same or different temperatures. For independent control of temperature in these areas, separate thermostats 26, 27 and 28 are provided, each thermostat being located in one of the spaces 23, 24 and 25, respectively, containing also corresponding radiators 12, 13 and 14, respectively.

For rendering the controller 19 responsive to the temperatures in the respective areas, a triple conductor control system is provided comprising three conductors 31, 32 and 33, which may be referred to for convenience as "on," "neutral" and "off" conductors, respectively. For convenience, the "on," "neutral" and "off" conductors 31, 32 and 33, and corresponding continuations thereof, are also identified by the letters R, W and B, representing colors red, white and blue, which may be employed for the insulation of the conductors for identification purposes in wiring the system.

Thermostatic relays 34 and 35, responsive to the thermostats 24 and 25 respectively, are provided for effecting control of the damper regulator 19 and the automatic radiator valves 21 and 22. The damper regulator 19 is shown as being of the type having a reversible motor 36 for operating the draft 37 and the check damper 38 of a solid fuel fired boiler in a conventional manner. The form of the reversible motor 36 illustrated involves an induction type rotor 39 cooperating with a pair of oppositely wound main stator windings 41 and 42, and a split phase or quadrature winding 43. For energizing the motor 36, an alternating current transformer 44 is provided having a secondary winding to which the split phase winding 43 is connected through a phase-splitting condenser 45 or the like and to which one or the other main windings 41 or 42 may be connected according to the direction in which the motor 36 is to rotate.

The damper regulator 19 is provided with control terminals 46, 47 and 48, respectively, corresponding to the control conductors 31, 32 and 33 and which may be therefore identified as "on," "neutral" and "off" terminals respectively. The terminals 46 and 48 are connected to the free ends of motor field windings 41 and 42 respectively for driving the motor in the "on" and "off" directions respectively and the terminal 47 is connected to the secondary winding of the transformer 44 for energizing one or the other of the windings 41 or 42 according to whether a contact is completed from the neutral terminal 47 to one or the other of the control terminals 46 and 48.

The thermostat 26 comprises a bimetallic blade 49 connected to a neutral thermostat terminal 51, and a pair of stationary contacts, or "on" and "off" terminals 52 and 53, with one or the other of which the moving blade 49 is adapted to make contact according to whether the temperature in the area 23 is below or above that which the thermostat 26 is designed to maintain.

The thermostats 27 and 28 may be similar in construction to the thermostat 26. As shown, they also have "neutral," "on" and "off" terminals 54, 55 and 56 and 57, 58 and 59, respectively. The thermostat relay 34 as shown comprises an operating winding 61 cooperating with an armature, not specifically illustrated, carrying three movable blades or contacts 62, 63 and 64 having a normal downward position. Cooperating with the blade 62 is a stationary normally-open holding contact 65; cooperating with the blade 63 is a stationary normally-closed valve-closing contact 66; and cooperating with the moving blade 64 are two stationary contacts, an upper or normally-open "on"-conductor contact 67 and a lower normally-closed neutral-conductor contact 68. Thus the blade 64 with its contacts 67 and 68 forms a double-throw or change-over contactor. For energizing the relay winding 61, a source of alternating current represented by a transformer 69 is provided and for permitting the relay 34 to be tripped out by short-circuiting the winding 61, a series resistor 71 is provided.

The relay 34 has "on," "neutral" and "off" control terminals 72, 73 and 74, identified also by characteristic letters R, W and B, and connected respectively to corresponding terminals 55, 54 and 56 of the thermostat 27.

The thermostat relay 35, controlled by the thermostat 28, may be constructed and connected in a manner analogous to the relay 34.

The automatic heat control valve 21 is preferably of a normally open type in order that failure of the power supply, energizing the controller transformer 44 and the relay transformer 69, or failure of the control circuit 31, 32, 33 will permit effective manual operation of the heat source 11 and uncontrolled or manually controlled operation of radiator 13, which may be provided with a manually controlled valve, not shown, for use in case of emergencies.

As illustrated, the valve 21 is of the electrically controlled type such as a valve of the type sold under the trade name of "Thrustor," or an electromagnetic valve having a control winding 75 cooperating with an armature or plunger 76 which is normally biased in upwards position by a spring 77 bearing against a collar 78 on a valve stem 79 to which the plunger 76 is secured. In the drawing, the valve 21 is illustrated as being energized, with its plunger 76 drawn downward against the force of the spring 77 so as to seat the valve gate 81. The valve 22 is constructed and connected similarly to the valve 21 and is shown in the drawing as de-energized so as to be unseated or open.

The "on" and "off" conductors 31 and 33 are connected to the "on" and "off" terminals 52 and 53 respectively of the thermostat 23. The neutral conductor 32 is connected to the neutral terminal 51 of the thermostat 26 through an extension of the neutral conductor represented by the lengths of conductors 82, 83 and 84 identified also by the letters RW which represent red and white, interlaced coloring in the conductor insulation, and return lengths of neutral conductors 85 and 86, identified also by the letter W. The normally closed contacts 64 and 68 of the relay 34 are interposed between the conductor lengths 32 and 82, and normally closed contacts 87 and 88 of the relay 35 are interposed between the conductor lengths 83 and 84. If the radiator 14 and the control elements 25 and 35 are to be the last ones in the system, a circuit between the conductor lengths 84 and 85 is completed between contacts of a switch 89 shown as closed, since no additional radiators and thermostats are shown. However, it will be understood that, if desired, the system may be continued as indicated beyond the right-hand end of the drawing for including additional radiator control valves and thermostats and thermostat relays if desired. Likewise, if the thermostat 25 and relay 35 are not to be used, they may be cut out of the system by closing a switch 91 between the conductor lengths 82 and 85, in which case the switch 89 should be opened. The pipe 15 is shown with a broken end 92 to represent the possible extension of the system to additional radiators, but it will be understood that this end of the pipe will be capped if no additional radiators are to be used.

To provide for disconnecting the thermostat 26, when no temperature control in the space 23 is desired, the double-throw switch 93 is provided. The double-throw switch 93 comprises a movable blade or contact 94 and a pair of stationary contacts 95 and 96. The contacts 94 and 95 are closed when the thermostat 26 is in operation; and the contacts 94 and 96 are closed when the thermostat 26 is to be rendered inoperative. Thus, the contacts 94 and 95 normally complete the circuit between the neutral conductor lengths 85 and 86.

The stationary contact 96 of the switch 93 is connected to the "off" conductor 33.

The "on" conductor 31 has extensions 97 and 98 leading to the relays 34 and 35 respectively for rendering the controller 19 responsive to the thermostats 27 and 28, respectively. The "on" conductor extension 97 is connected to the upper contact 67 of the double-throw contactor including the blade 64 of the thermostat relay 34. Similarly, the "on"-conductor extension 98 is connected to a normally open upper contact 99 on the relay 35.

An automatic radiator control valve and a thermostat relay corresponding to the elements 21 and 34 respectively may be provided for the space 23, but may also be omitted if desired, for the sake of simplicity assuming the space 23 is the one which normally runs the coolest by reason of dimensions of the space heated, exposure, or some other reason. Consequently whenever the temperature in the space 23 falls below that for which the thermostat 26 is set, regardless of the temperature in the spaces 24 and 25, a contact will be closed between the "on" and "neutral" terminals 51 and 52 and the heat controller 19 will be driven in the "on" position to open the draft 37 and close the check 38. Assuming that the temperature in the space 24 is or has been higher than required and that the space 25 is lower than required, the thermostats 27 and 28 take up the positions illustrated in the drawing.

More exactly, the thermostat 27 is shown in a floating position, the "neutral" contact 54 making electrical connection with neither the "on" contact 55 nor the "off" contact 56. It is assumed, however, that the contacts 54 and 56 have previously made electrical connection, short-circuiting the control winding 61, tripping out the relay and causing the relay contacts 62, 63 and 64 to fall to the lower position. Under these circumstances, the valve closing contacts 63 and 66 are closed, thereby closing an electrical circuit from a current source 101 to the valve control winding 75 and moving the valve gate 81 downwardly into the seated or closed position as illustrated. Furthermore, the relay contacts 64 and 68 of the relay 34 are closed, leaving a neutral conductor circuit between conductor lengths 32 and 82 and allowing the heating system to be controlled by both thermostats 26 and 28.

In the space 25, in which the temperature is assumed to be below that for which the thermostat 28 is set, the thermostat "neutral" and "on" contacts 59 and 58 have been closed by the temperature condition and the relay winding 102 has accordingly been energized closing holding contacts 103, opening valve-closing contacts 104 and moving the changeover contact or blade 87 to the upward position making contact with the upper stationary contact 99. Owing to the fact that the valve closing contacts 104 have been opened, the control winding of the valve 22 is deenergized and the biasing spring 105 moves the valve 22 to the open position causing heat energy to be supplied to the radiator or heat dissipating device 14.

Owing to the fact that contact has been completed between changeover contactor contacts 87 and 99 of the relay 35, the neutral conductor length 83 has been disconnected from the neutral conductor length 84 depriving the thermostats 23 and 24 of control of the heat controller 19. Furthermore the neutral conductor length 83 has been connected to the "on" conductor extension 98 causing a circuit to be completed between the controller terminals 47 and 46 causing it to move into the "on" or increasing heat position. The thermostat 26, alone, forms a temperature-responsive regulator in the space 23, whereas in the space 24, a temperature regulator is formed by the thermostat 27 and the relay 34 taken together.

Although in the system illustrated and specifically described the extension conductors, such as the conductors 97 and 98 connected to the normally open changeover contacts 67 and 99, are connected to the "on" conductor 31 rather than to the "off" conductor 33, it will be understood that my invention is not limited to that shown. Nevertheless the arrangement illustrated is preferable if the space 23 tends to be coolest, whereas the reverse arrangement, with connection to the "off" conductor 33, could be used if the space 23 were the one that tended to be warmest. For cutting out the thermostat 26 the contact 96 of the switch 93 would be connected to the conductor 31 instead of the conductor 33 when the conductors 97 and 98 were connected to the conductor 33.

If desired, the system illustrated may be utilized in connection with a heat supply source arranged also for providing hot water, the temperature of which is controlled by an "Aquastat" 106. For example, if desired, the thermostat 26 may be located within the water chamber of the boiler 11 or take the form of the "Aquastat" 106 instead of being located in the space 23.

In the event that snap-action thermostats of the type having only a single stationary contact are used in the spaces 24 and 25, the contacts 62, 65 and 103 may be omitted and the double-throw contactors 64 and 87 serve to adapt snap-action thermostats to control of a three-contact type controller such as the damper-regulator 19.

Although, for the sake of convenience and simplicity, the system for distributing energy and controlling the relative amounts distributed in the various spaces has been described as a steam heating system, it will be understood that the invention is not limited thereto and may be utilized in connection with other forms of distribution of energy or distribution of heat such as hot water systems, hot air systems and the like employing heat controlling valves or dampers; or may be used in connection with a system for distributing some other form of energy such as ultra high frequency or micro wave energy in which the energy is transmitted through coaxial lines, pipes of the wave guide type or the like and in which distribution of energy is controlled by movable dampers or reflectors within the wave-guide pipes. It will be understood that such movable dampers would take the place of steam valves 21 and 22 for wholly or partially closing a hollow-pipe wave guide when wave energy passage through the pipe was to be restricted or cut-off. Such a movable damper may be arranged in the manner of the vane 113 shown in the hollow pipe 107 in Fig. 55 of Patent 2,206,923 to Southworth.

It may be desired that such electric wave distribution means be employed, for example, in controlling the distribution and relative intensity in different parts of a system of micro wave energy utilized for induction heating, in industrial processes or the like, as well as for communications, object detection, direction finding, etc.

Likewise, the invention is not limited to the use of a particular form of a controller such as the damper regulator 19. The heat controller might take the form of an "on" or "off" type control, for example, such as a system comprising a blower 107 driven by a motor 108 controlled by a relay 109. The relay 109 may be similar in general construction to the relays 34 and 35 in that it has normally open holding contacts 111 and normally open contacts 112 for energizing the motor 108 when the relay is energized. The contacts 112 correspond to the contacts 64, 67 of the relay 34, for example. When the heat controller 107—109 is to be used instead of the controller 19, the control system conductors 31, 32 and 33 are connected to control terminals 113, 114 and 115 of the relay 109, corresponding to the conductors 72, 73 and 74 of the relay 34, for example. To permit alternatively using the heat controller 19 or the motor 107, a triple-pole double-throw switch 116 may be provided.

If desired, the system illustrated in Fig. 1 may also be employed for independently controlling temperatures in various spaces such as the spaces 23, 24 and 25 and water temperature in a suitable reservoir 117 (Fig. 2). In this case, an additional relay-controlled valve and corresponding parts are provided such as an "Aquastat" 118 corresponding to the thermostat 27, a relay 119 controlled by the "Aquastat" 118 and corresponding to the relay 34, and an electrically controlled valve 121 corresponding to the valve 21 and controlled by the relay 119. Such a system may be employed in connection with a boiler 11 having a heat exchanger 122 of conventional type, connected by supply and return pipes 123 and 124, respectively, to the storage tank 117. The control valve 121 is interposed in one of the pipe connections 123 or 124. The arrangement of Fig. 2 is represented only schematically but it will be understood that the connections and arrangements of the elements 118, 119 and 121 are similar to those of the corresponding elements utilized for controlling the heat supply to the radiator 13, for example.

I have herein shown and particularly described certain embodiments of my invention and certain methods of operation embraced therein for the purpose of explaining its principle of operation and showing its application but it will be obvious to those skilled in the art that many modifications and variations are possible and I am, therefore, to cover all such modifications and variations as fall within the scope of my invention which is defined in the appended claims.

What is claimed is:

1. A heating system comprising a heat energy source, a plurality of radiators in different spaces to be heated, a distribution line connecting said radiators to said heat source, a plurality of thermostats, each in one of said spaces, an electrically controlled normally-open valve between said distribution line and each radiator except the first, an electric controller for the said heat source, a triple conductor control-circuit system running from said controller to said thermostats, and a thermostat relay for each thermostat except the first, each thermostat being of the double-throw type having "on" and "off" terminals and a temperature-responsive moving blade connected to a "neutral" terminal, and the controller being of the three-terminal reversing type with "on," "off," and "neutral" terminals, increasing heat when the "on" and "neutral" terminals are connected and decreasing heat when the "off" and "neutral" terminals are connected, the control circuit system including "on," "off" and "neutral" conductors connected respectively to the "on," "off" and "neutral" controller terminals, the first thermostat having its "on" and "off" terminals connected to the "on" and "off" conductors respectively and its "neutral" terminal in circuit with the "neutral" conductor, each thermostat relay including "on," "off" and "neutral" individual control terminals, a double throw neutral-conductor contactor, and a normally-closed valve-closing contactor, each thermostat except the first having its "on," "off" and "neutral" terminals connected to corresponding terminals of a corresponding relay, each relay double-throw contactor comprising normally closed contacts in series with the neutral conductor between the heat controller and the first thermostat and normally open contacts between said "neutral" conductor and the "on" conductor, each valve having a control winding in circuit with the valve-closing contactor of the relay connected to the thermostat within the same space as the radiator controller by such valve.

2. A heating system comprising a heat energy source, a plurality of radiators in different spaces to be heated, a distribution line connecting said radiators to said heat source, a plurality of thermostats, each in one of said spaces, a plurality of electrically controlled normally open valves each between said distribution line and a radiator, an electric controller for the said heat source, a triple conductor control circuit system running from said controller to said thermostats, and a thermostat relay for each valve, each thermostat being of the double throw type having "on" and "off" terminals and a temperature responsive moving blade connected to a "neutral" terminal, and the controller being of the three-terminal reversing type with "on," "off," and "neutral" terminals, increasing heat when the "on" and "neutral" terminals are connected and decreasing heat when the "off" and "neutral" terminals are connected, the control circuit system including "on," "off," and "neutral" conductors connected to corresponding controller terminals, each thermostat relay including "on," "off" and "neutral" individual control terminals, a double-throw neutral-conductor contactor, and a normally-closed valve-closing contactor, each relay having its "on," "off" and "neutral" control terminals connected to corresponding terminals of a corresponding thermostat, each relay double-throw contactor comprising normally closed contacts in series with the neutral conductor between the heat controller and the first thermostat and normally open contacts between said "neutral" conductor and the "on" conductor, each valve having a control winding in circuit with the valve-closing contactor of the relay connected to the thermostat within the same space as the radiator controlled by such valve.

3. A heating system comprising a heat energy source, first and second radiators in different spaces to be heated with connections to said heat source, first and second thermostats each within one of said spaces, an electrically controlled normally-open valve in the connection to said second radiator, an electric controller for the said heat source, a control circuit system running from said controller to said thermostats, and a thermostat relay for said second thermostat, said thermostats being of the double throw type having "on" and "off" terminals and a temperature-responsive moving blade with a "neutral" terminal connected thereto, and the controller being of the three-terminal reversing type with "on," "off" and "neutral" terminals, increasing heat when the "on" and "neutral" terminals are connected and decreasing heat when the "off" and "neutral" terminals are connected, the control circuit system including "on," "off" and "neutral" conductors connected between the "on," "off" and "neutral" terminals respectively of said controller and said first thermostat, the relay having "on," "off" and "neutral" control terminals connected to respective corresponding terminals of said second thermostat, a double-throw neutral-conductor contactor, and a normally-closed valve-closing contactor, said double-throw contactor comprising normally closed contacts in series with the "neutral" conductor and normally open contacts between said "neutral" conductor and said "on" conductor, the valve having a control winding in circuit with the valve-closing contactor.

4. A heating system comprising a heat energy source, a thermostat for controlling the same of the double-throw type having "on" and "off" terminals and a temperature-responsive blade with a "neutral" terminal connected thereto, a radiator in a space to be heated with a connection to said heat source, a second thermostat in said space, an electrically controlled normally-open valve in the connection to the radiator, an electric controller for said heat source having "on," "off" and "neutral" terminals and being of the type increasing heat when the "on" and "neutral" terminals are closed and decreasing heat when the "off" and "neutral" terminals are closed, "on," "off" and "neutral" conductors connected between the "on," "off" and "neutral" terminals, respectively, of the controller and said first thermostat, and means controlled by said second thermostat including a double-throw neutral-conductor contactor and a normally-closed valve-closing contactor, said double-throw contactor comprising normally closed contacts in series with the neutral conductor and normally open contacts between said "neutral" conductor and said "on" conductor, the valve having a control winding in circuit with the valve-closing contacts.

5. A heating system comprising a heat energy source of the controlled combustion type, a thermostat for controlling the same of the double-throw type having "on" and "off" terminals and a temperature-responsive blade with a neutral terminal connected thereto, a radiator in a space to be heated with a connection to said heat source, a second thermostat in said space, alternative electric combustion controllers for said heat source, one being of the damper-regulator type, and each having "on," "off" and "neutral" terminals and being of the type increasing heat when the "on" and "neutral" terminals are closed and decreasing heat when the "off" and "neutral" terminals are closed, a three-pole double-throw transfer switch having corresponding stationary contacts connected to corresponding terminals of said controllers and three movable contacts, each with a terminal, designated as an "on", "off" or "neutral" terminal, "on", "off" and "neutral" conductors connected between the "on", "off" and "neutral" terminals, respectively, of the transfer switch and said first thermostat, and a double-throw neutral-conductor contactor controlled by said second thermostat, said double-throw contactor comprising normally closed contacts in series with the "neutral" conductor and normally open contacts between said "neutral" conductor and said "on" conductor.

6. A heating system comprising a heat energy source, a thermostat for controlling the same of the double-throw type having "on" and "off" terminals and a temperature-responsive blade with a "neutral" terminal connected thereto, a radiator in a space to be heated with a connection to said heat source, a second thermostat in said space, an electrically controlled valve in the connection to the radiator, an electric controller for said heat source having "on," "off" and "neutral" terminals and being of the type increasing heat when the "on" and "neutral" terminals are connected and decreasing heat when the "off" and "neutral" conductors are connected, "on," "off" and "neutral" conductors between the "on," "off" and "neutral" terminals, respectively, of the controller and said first thermostat, and means controlled by said second thermostat including a double-throw neutral-conductor contactor and a valve-operating contactor, said double-throw contactor comprising normally closed contacts in series with the neutral conductor and normally open contacts between said "neutral" conductor and said "on" conductor, the valve having a control winding in circuit with said valve-operating contactor.

7. A triple-conductor control system for use in controlling a condition by whichever one of a plurality of regulators is actuated comprising "on," "off" and "neutral" conductors, a plurality of three-terminal regulators in succession, connected to said conductors, a control transfer contactor associated with each regulator for cutting out a succeeding one of said regulators upon actuation of the regulator with which the control transfer contactor is associated, each such contactor comprising a double-throw switch with a pair of normally closed contacts in series with said neutral conductor, and a third contact connected to one of the other conductors and adapted to make contact with one of the other contacts when a regulator is to be cut out, and a switch for by-passing said normally closed contacts of any contactor when succeeding regulators and contactors are to be cut out.

8. An energy distribution system comprising an energy source, first and second energy consumers located in different spaces to be supplied with energy and having connections to said source, first and second intensity-responsive devices, each in one of said spaces, an electrically controlled normally-open valve in the connection to said second energy consumer, an electric controller for the said source, a control circuit system running from said controller to said first intensity-responsive device, and a relay for said second intensity-responsive device, said intensity-responsive devices being of the double-throw type having "on" and "off" terminals and an intensity-responsive moving element with a "neutral" terminal connected thereto, and the controller being of the three-terminal reversing type with "on," "off" and "neutral" terminals, increasing energy supply when the "on" and "neutral" terminals are connected and decreasing energy supply when the "off" and "neutral" terminals are connected, the control circuit system including "on," "off" and "neutral" conductors connected between the "on," "off" and "neutral" terminals respectively of said controller and said first intensity-responsive device, the relay having "on," "off" and "neutral" control terminals connected to respective corresponding terminals of said second intensity-responsive device, a double-throw neutral-conductor contactor, and a normally-closed valve-closing contactor, said double-throw neutral-conductor contactor comprising normally closed contacts in series with the "neutral" conductor and normally open contacts between said "neutral" conductor and said "on" conductor, the valve having a control winding in circuit with the valve-closing contactor.

9. An energy distribution system comprising an energy source, first and second energy consumers located in different spaces to be supplied with energy and having connections to said source, first and second intensity-responsive devices each in one of said spaces, an electrically controlled valve in the connection to said second energy consumer, an electric controller for the said source, a control circuit system running from said controller to said first intensity-responsive device, and a relay for said second intensity-responsive device, said intensity-responsive devices being of the double-throw type having "on" and "off" terminals and an intensity-responsive moving element with a "neutral" terminal connected thereto, and the controller being of the three-terminal reversing type with "on," "off" and "neutral" terminals, increasing energy supply when the "on" and "neutral" terminals are connected and decreasing energy supply when the "off" and "neutral" terminals are connected, the control circuit system including "on," "off" and "neutral" conductors connected between the "on," "off" and "neutral" terminals respectively of said controller and said first intensity-responsive device, the relay having "on," "off" and "neutral" control terminals connected to respective corresponding terminals of said second intensity-responsive device, a double-throw neutral-conductor contactor, and a valve-operating contactor, said double-throw contactor comprising normally-open and normally-closed contacts, one set of contacts being in series with the "neutral" conductor and the other set being between said "neutral" conductor and said "on" conductor, the valve having a control winding in circuit with the valve-operating contactor.

FREDERIC B. SCHRAMM.

REFERENCES CITED

The following references are of record in the file of this patent:

UNITED STATES PATENTS

| Number | Name | Date |
|---|---|---|
| 1,167,815 | Gold | Jan. 11, 1916 |
| 2,013,450 | Stark | Sept. 3, 1935 |
| 2,067,426 | Stuart | Jan. 12, 1937 |
| 2,119,153 | Dallenbach | May 31, 1938 |
| 2,153,382 | Martin | Apr. 4, 1939 |
| 2,244,631 | Nessell | June 3, 1941 |
| 2,304,124 | Sampsel | Dec. 8, 1942 |
| 2,310,745 | Parks et al. | Feb. 9, 1943 |